Dec. 31, 1946.　　　　J. KOLARIK　　　　2,413,634
CALIPER BRACE
Filed May 18, 1944　　　　2 Sheets-Sheet 1
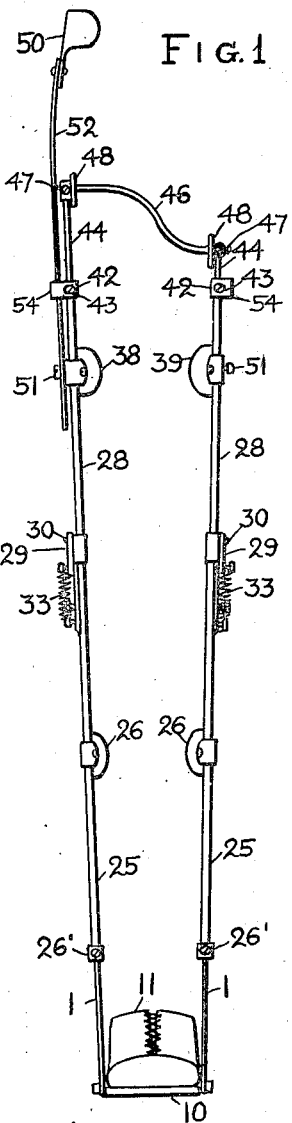
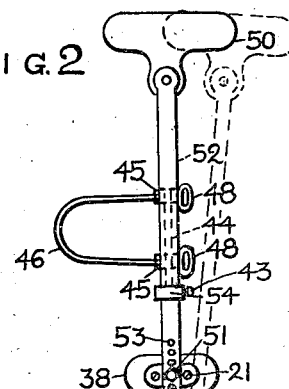
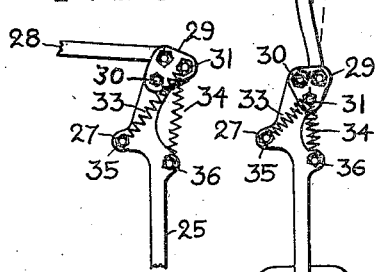
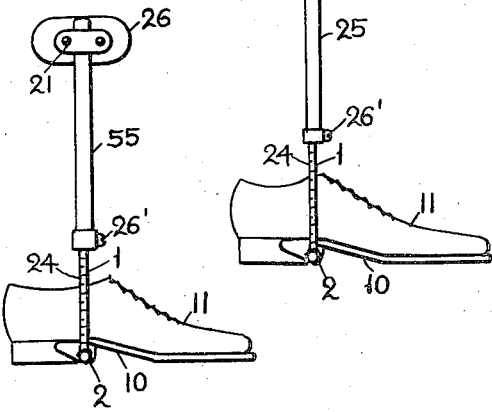
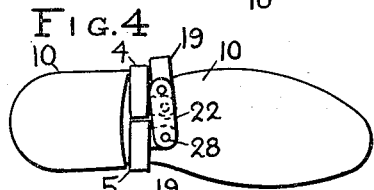
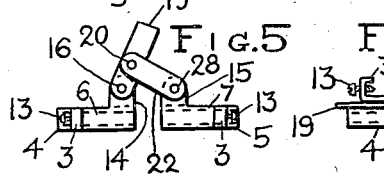
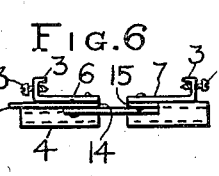
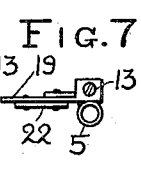
JOHN KOLARIK
INVENTOR
BY John P. Nilonow
ATTORNEY Dec. 31, 1946.   J. KOLARIK   2,413,634
CALIPER BRACE
Filed May 18, 1944   2 Sheets-Sheet 2

JOHN KOLARIK
INVENTOR

BY John P. Nikonow
ATTORNEY

Patented Dec. 31, 1946

2,413,634

UNITED STATES PATENT OFFICE 2,413,634

CALIPER BRACE

John Kolarik, Brooklyn, N. Y.

Application May 18, 1944, Serial No. 536,076

5 Claims. (Cl. 128—80)

My invention relates to orthopedic appliances and has particular reference to appliances in the form of caliper braces for fractures of the leg and hip.

My invention has for its object to provide a light and strong caliper brace which can be adjusted in different portions to the different length of the patient's leg without making any changes in the brace and can be used on either the right or the left leg.

Another object of my invention is to provide a caliper brace which can be bent at the knee and which will return to the vertical position by a spring action without the necessity of aiding this movement by hand.

Another object of my invention is to provide a caliper brace which can be conveniently attached to the hip portion of the patient's body.

Another object of my invention is to provide a caliper brace which in a shortened form can be used as an ankle brace.

Still another object of my invention is to provide a clamping device which can be readily attached to a shoe of an ordinary size, the attachment and detachment being performed without the aid of any special tools, the clamp being also provided with a pivotal connection to the lower portions of the legs of the caliper brace.

My invention is more fully described in the accompanying specification and drawings in which:

Fig. 1 is a front view of my caliper brace;

Fig. 2 is an elevational view of the same;

Fig. 3 is a fractional view of the knee joint of the brace in condition in which the patient's knee is bent;

Fig. 4 is a bottom view of a shoe with my clamping tube attachment;

Fig. 5 is a side view of the clamping attachment in a released position;

Fig. 6 is a front view of the clamping attachment in a locked position;

Fig. 7 is an end view of the same.

Fig. 8 is a side view of a shortened device used as an ankle brace.

Figure 9:
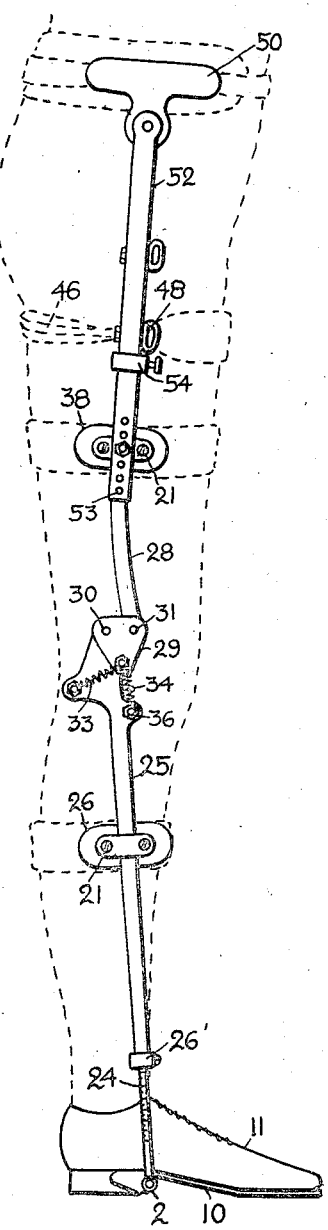
Fig. 9 is a side elevational view of my caliper brace on the patient's leg, the latter being shown in dotted lines.

My caliper brace as shown in Figs. 1, 2 and 3 consists of a pair of vertical legs 1 having eyes 2 at the bottom pivotally engaging a bolt or pin 2 of a shoe clamp. The bolt is placed in tubes 4, 5 to which plates 6, 7 are welded. The plates are provided with hooks 8 at the ends for engaging the sole 10 of a shoe 11. Sharp pointed screws 13 may be provided in the hooks for engaging the edge of the sole and for preventing slippage of the clamp lengthwise on the shoe. The plates are also provided with raised lugs 14, 15. A locking arm 19 is pivotally connected to the lug 14 at 16 and is also pivotally connected at 20 to one end of a link 22, the other end of the link being pivotally connected to the lug 15 at 28. The pivots may be in the form of rivets or bolts. Fig. 5 illustrates the released position of the clamping device, the tubes 4, 5 being moved apart for placing them on the shoe. By rotating the arm 19 as shown in dotted lines in Fig. 5, the tubes are drawn together, the hooks 9 and screws 13 firmly engaging the sole of the shoe. The arm 19 is finally placed against the tube 4 as shown in Fig. 4, the pivot 20 being then nearer the tube 14 than the pivot 16 so that the clamping device will be securely locked and cannot work itself loose in service. For releasing the clamp, the arm 19 is rotated backwards into the position shown in Fig. 5.

The legs 1 are telescopically and slidably fitted in tubular leg members 25 or calf portions and are secured in an adjusted position by screws 26. Calf bands 26 are mounted on the tubes 25. The calf bands may be adjustably held in position by friction or they may be provided with suitable clamping screws 21. Divisions 24 are provided on the legs 1 to indicate their adjustment in suitable units of length.

The upper portions of the members 25 are provided with plates 27 which may be welded to the members 25 and which form the bases for knee joints. Upper members or thigh portions 28 are provided with offset plates 29 at the lower ends pivoted at 30 to the plates 27 and having extensions with pins or eyes 31 to which springs 33, 34 are attached, the other ends of the springs are attached to bolts or eyes 35, 36 on the base plates 27. The lower ends of the members 28 rest against the edges of the plates 27 when they are in a vertical position as shown in Fig. 2 in dotted lines thereby preventing a forward bending of the knee, but the upper members can be deflected rearwards as shown in Fig. 3, the springs returning the parts 25 into the vertical position when the bending pressure is released.

Thigh bands 38, 39 are mounted on the upper members 25 and are held in place by friction or by suitable screws. The upper ends of the thigh members 28 are provided on top with sockets 42 with screws 43 for tightening extension rods 44 in position, the extension rods being provided on top with sockets 45 for the ends of perineal ring 46 and also with eyes or buckles 48 for additional groin straps. Screws 47 are provided for securing the perineal rings in their positions.

A pelvic band 50 may be adjustably attached to the outer thigh brace, right or left, by a screw 51 fitted into the corresponding thigh band as shown in Figs. 1 and 2. The stem 52 of the pelvic band is provided for this purpose with a number of holes 53 for the screw 51. The stem is guided by a ring loop 54 on the socket 42.

With this arrangement of the pelvic band the hip is held intact and the entire weight of the body is supported on the upper portions of my brace, the perineal ring particularly supporting the ischium bone, so that the leg and the foot are entirely relieved from any pressure, the foot being so placed that it does not touch the inner heel of the shoe.

My caliper brace can be also used as an ankle brace as shown in Fig. 8, the calf members 55 being relatively short and without the knee portions.

My caliper brace has important advantages, particularly because it enables the patient to walk in a substantially normal manner and to bend the knee when desired as, for instance, for assuming a sitting position. The brace can be easily adjusted as regards its length in different portions, and can be easily and quickly attached to a shoe of any ordinary size. It is therefore called "walking caliper brace."

It should be noted that my spring action knee is formed with an offset pivot 30 so arranged that the pressure of the body on the brace results in a horizontal component force directed rearwards, as shown in Fig. 9, this force tending to lock the hinged brace portion in the vertical position with the lower end of the member 28 resting against the front side of the member 25. This effect may be still further enhanced by aligning the parts 25 and 28 at a small angle to each other, moving the pivot 30 still further to the rear of the brace. Any normal vertical pressure of the body under such conditions tends to lock the brace in its load-supporting position.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A caliper brace comprising a thigh member and a calf member; means to support the thigh member on a patient's thigh; means to support the calf member on the patient's calf; an inverted triangular enlarged portion at the lower end of the thigh member, the thigh member extending from the upper front corner of the triangular portion; a pivot offset rearwardly from the axis of the thigh and calf members connecting the upper rear corner of the thigh enlarged portion with the upper end of the calf enlarged portion; means at the lower end of the triangular enlarged portion to limit the forward rotation of the members on the pivot; and a spring connecting the lower corner of the triangular enlarged portion with the rear end of the rearward extension of the calf member for urging the thigh member into the position of engagement with the calf member.

2. A caliper brace comprising a thigh member and a calf member; means to support the thigh member on a patient's thigh; means to support the calf member on the patient's calf; an inverted triangular enlarged portion at the lower end of the thigh member, the thigh member extending from the upper front corner of the triangular portion; a rearward extending projection at the enlarged portion at the upper end of the calf member, the calf enlarged portion having at the lower end a rearward extending projection; a pivot offset rearwardly from the axis of the thigh and calf members connecting the upper rear corner of the thigh enlarged portion with the upper end of the calf enlarged portion; means at the lower end of the triangular enlarged portion to engage the front side of the calf enlarged portion for limiting the forward rotation of the members on the pivot; a spring connecting the lower corner of the triangular enlarged portion with the rear end of the rearward extension of the calf member for urging the two members into alignment; and a second spring connecting the lower corner of the triangular enlarged portion with the lower portion of the calf enlarged portion.

3. A caliper brace comprising a pair of thigh members and a pair of calf members, each thigh member being pivotally connected to the corresponding calf member; means to support the thigh and calf members on a patient's leg; telescopic extensions of rectangular cross section at the lower ends of the calf members, a pair of tubular members having hooks for engaging the edges of the sole of the patient's shoe; toggle members on the tubular members for clamping the tubular members in a mutual alignment on the patient's shoe; and a rod rotatively fitted in the tubular members and attached at the ends to the lower ends of the telescopic extensions.

4. A caliper brace comprising a pair of thigh members and a pair of calf members, each thigh member being pivotally connected to the corresponding calf member; means to support the thigh and calf members on a patient's leg; telescopic extensions of rectangular cross section at the lower ends of the calf members; a pair of tubular members having hooks for engaging the edges of the sole of the patient's shoe; lugs at the sides of the tubular members; toggle links pivotally connected to the lugs and pivotally connected together for drawing the tubular members toward each other for clamping the tubular members on the patient's shoe; a rod rotatively supported in the tubular members; and means at the ends of the rod to attach the rod to the lower ends of the telescopic extensions.

5. A caliper brace comprising calf members; enlarged portions at the upper ends of the calf members; thigh members; enlarged portions at the lower ends of the thigh members having rearward extensions; pivots offset rearwardly from the axis of the thigh and calf members connecting the rearward extensions of the thigh members with the upper ends of the calf enlarged portions, the downward extensions of the thigh enlarged portions being arranged to engage the front sides of the calf enlarged members when downward pressure is applied to the thigh members; and springs connecting the front portions of the thigh enlarged portions with the calf enlarged portions for urging the members into a mutual alignment.

JOHN KOLARIK.